June 9, 1964
E. C. BENBOW
3,136,947
MAXIMUM-DEMAND MEASURING DEVICE WITH PLURAL
SEQUENTIALLY OPERATED PUSHER MEMBERS
Filed May 20, 1960
3 Sheets-Sheet 1
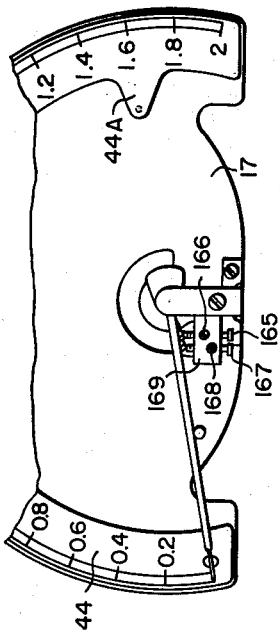
Fig. 9.
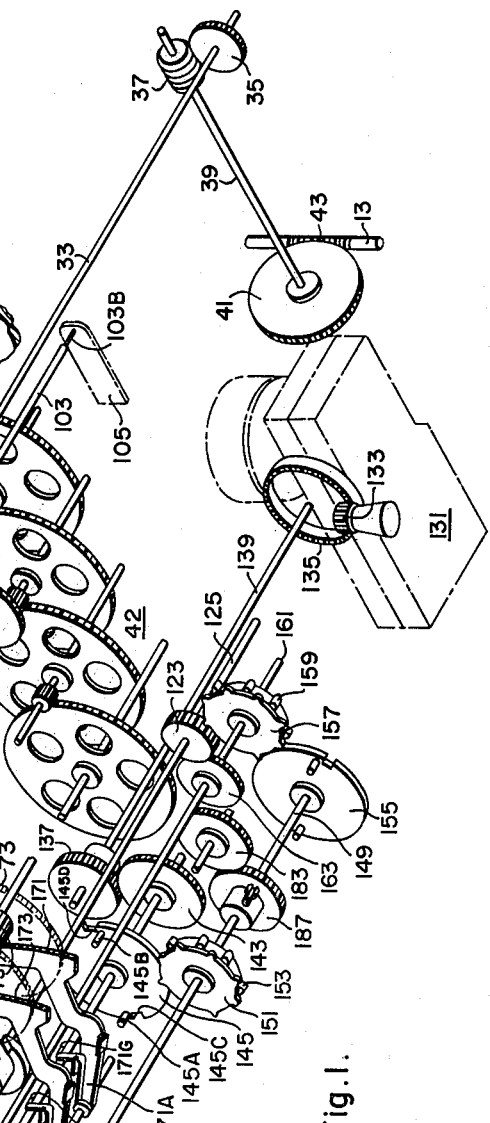
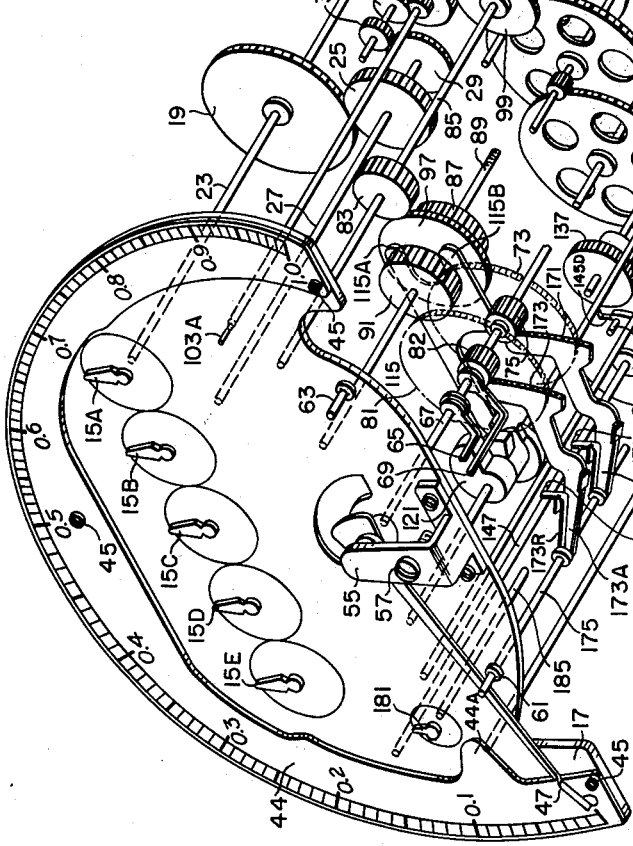
Fig. 1.
INVENTOR
Eugene C. Benbow
BY
ATTORNEY

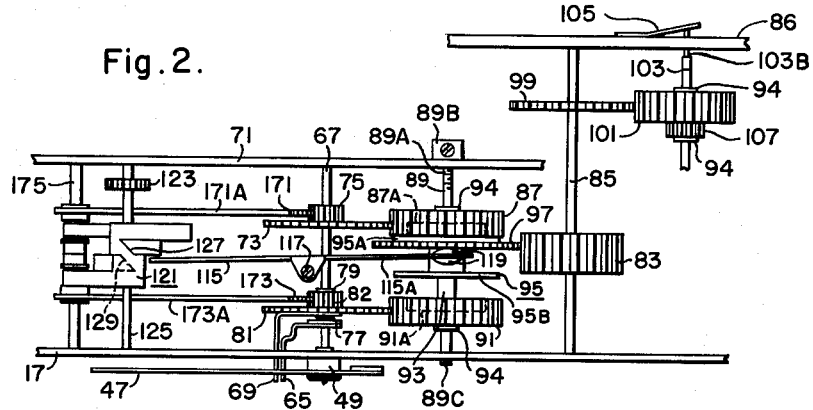
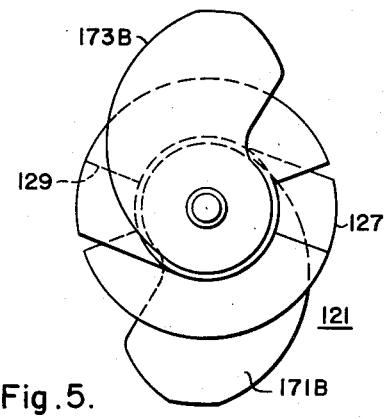
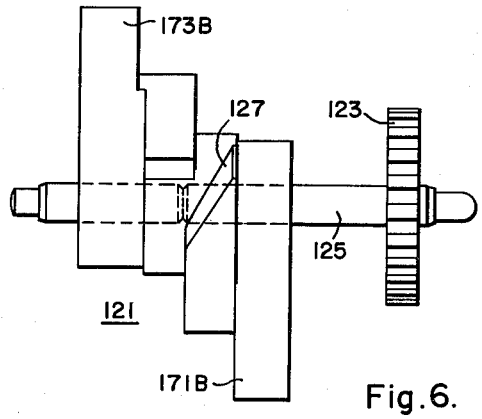
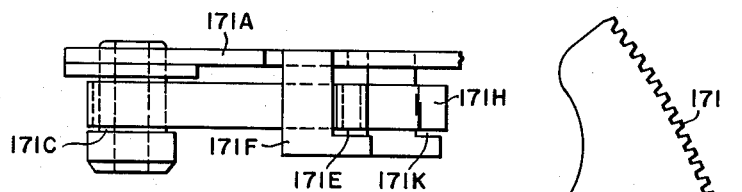
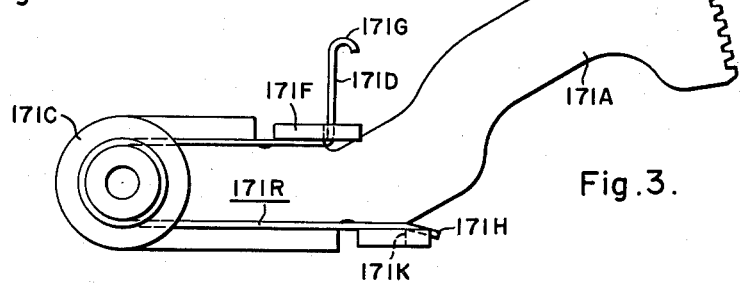

June 9, 1964    E. C. BENBOW    3,136,947
MAXIMUM-DEMAND MEASURING DEVICE WITH PLURAL
SEQUENTIALLY OPERATED PUSHER MEMBERS
Filed May 20, 1960    3 Sheets-Sheet 3

United States Patent Office 3,136,947
Patented June 9, 1964

1

3,136,947
MAXIMUM-DEMAND MEASURING DEVICE WITH PLURAL SEQUENTIALLY OPERATED PUSHER MEMBERS
Eugene C. Benbow, Raleigh, N.C., assignor to Westinghouse Electric Corporation, East Pittsburgh, Pa., a corporation of Pennsylvania
Filed May 20, 1960, Ser. No. 30,598
19 Claims. (Cl. 324—103)

This invention relates to measuring devices and it has particular relation to measuring devices for measuring the maximum-demand of a variable quantity.

In one form of maximum-demand measuring devices, a maximum-demand indicating member such as a pointer is advanced during a billing period to a position corresponding to the maximum of the demands occurring during demand intervals. Although different billing periods and demand intervals are employed, it will be assumed for present purposes that the billing period has a duration of one month and that the demand interval has a duration of 15 minutes. With these assumptions, the maximum-demand pointer must indicate the maximum of the demands for energy for 15 minute intervals occurring during the billing period.

In accordance with the invention, two pusher members are coupled alternately to a measuring unit for the purpose of advancing the maximum-demand indicating member to its proper position. When one of the pusher members is coupled to the measuring unit, the other pusher member is decoupled from the measuring unit and is reset to a zero position. A positive resetting force is applied by a motor which also may be employed for timing purposes.

Preferably, the various control functions such as the coupling of the pusher members to the measuring unit, the decoupling of the pusher members from the measuring unit and the resetting of the pusher members are supervised by a common control unit. This control unit may take the form of a cam unit operated by the timing motor and having a plurality of camming surfaces. Although the cam unit may be rotated about an axis continuously by the timing motor, preferably the cam unit is advanced in steps by the timing motor through an intermittent drive. This facilitates the fast movement of the cam unit through a camming position while providing long intervals between certain camming positions.

The invention further contemplates a dual-range measuring device wherein two interchangeable scales are provided and wherein the substitution of one scale for the other automatically adjusts the coupling of the measuring device for the new scale.

It is, therefore, an object of the invention to provide an improved demand measuring device.

It is another object of the invention to provide a demand measuring device wherein an indicating member is operated from a measuring unit through two alternatively-effective paths.

It is also an object of the invention to provide a measuring device as recited in the immediately preceding paragraph wherein all control functions are supervised by a common control unit.

It is a further object of the invention to provide a measuring device as set forth in either of the immediately preceding two paragraphs wherein the transfer between the two paths is rapidly effected.

Other objects of the invention will be apparent from the following description taken in conjunction with the accompanying drawings in which:

FIGURE 1 is a view in perspective of a measuring device embodying the invention with parts broken away;

2

FIG. 2 is a view in top plan with parts broken away showing a portion of the measuring device of FIG. 1;

FIG. 3 is a view in front elevation of a resetting member employed in the measuring device of FIG. 1;

FIG. 4 is a view in top plan with parts broken away of the resetting member shown in FIG. 3;

FIG. 5 is a view in front elevation of a control unit employed in the measuring device of FIG. 1, but rotated 90° from the position shown in FIG. 1;

FIG. 6 is a view in top plan of the control unit shown in FIG. 5;

FIG. 9 is a view in front elevation with parts broken away of the measuring device shown in FIG. 1 but with a scale member employed in the device reversed.

Figure 7:
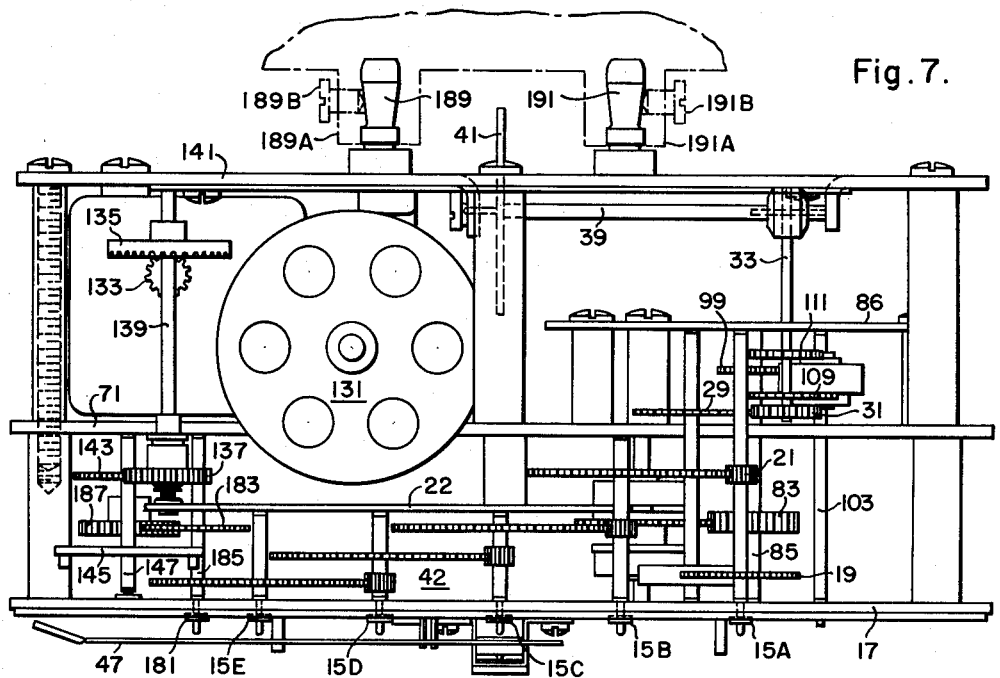
FIG. 7 is a view in top plan of the measuring device shown in FIG. 1.

Referring to the drawings, FIG. 1 shows a measuring device which includes a maximum-demand register 11 for measuring the maximum-demand of a variable quantity. Although various quantities may be measured it will be assumed for present purposes that electrical energy is to be measured. For present purposes, it will be assumed that electrical energy is being measured by a conventional induction-disk-type electrical watt-hour meter which is represented in FIG. 1 by its shaft 13. It will be understood that the shaft 13 rotates at a rate dependent upon the electrical power being supplied to an electrical circuit with which the watt-hour meter is associated.

In order to indicate the consumption of electrical energy, five pointers 15A, 15B, 15C, 15D and 15E are mounted for rotation in front of a dial plate 17. Although the dial plate may be oriented in any desired plane, it will be assumed that the dial plate is in a vertical plane when the register is in operative position. The pointer 15A, the gear 19 and a pinion 21 are secured to a shaft 23 which is mounted by the dial plate 17 and a plate 86 for rotation with respect to the plates. The gear 19 meshes with a pinion 25 which is secured to a shaft 27. The shaft 27 is mounted for rotation with respect to the dial plate and carries a gear 29 which meshes with a pinion 31 secured to a shaft 33. The shaft 33 also is mounted for rotation with respect to the dial plate and carries a worm wheel 35 which engages a worm 37 mounted on a shaft 39. Rotation of the shaft 39 with respect to the dial plate is accomplished by a worm wheel 41 secured to the shaft 39 and engaging a worm 43 which is formed in the shaft 13 of the watt-hour meter. Consequently, the pointer 15A rotates in accordance with rotation of the shaft 13. The pinion 21 is employed for driving the remaining pointers 15B to 15E through suitable gearing 42 selected to rotate the respective pointers at rates which are $\frac{1}{10}$, $\frac{1}{100}$, $\frac{1}{1000}$ and $\frac{1}{10,000}$ the rate of rotation of the pointer 15A. Shafts supporting the pointers 15B to 15E and the gearing 42 are journaled in the plate 17 and a plate 22 (FIG. 7). Thus, the dial plate 17 may be calibrated in a conventional manner to permit the position of the pointers to indicate the watt-hours measured by the associated watt-hour meter components.

For indicating maximum-demand, the dial plate 17 has an arcuate scale member 44 releasably secured thereto in any suitable manner as by machine screws 45. This scale member 44 is symmetrical about a vertical axis except for a tongue 44A. When the scale member 44 is reversed about a vertical axis to the position illustrated in FIG. 9, the tongue 44A modifies certain gearing in order to adjust the range of the register in a manner which will be discussed below. In the position illustrated in FIG. 9, the scale member 44 presents a scale which differs from the scale shown in FIG. 1 and which is designed to correspond to the new range of the register.

Figure 8:
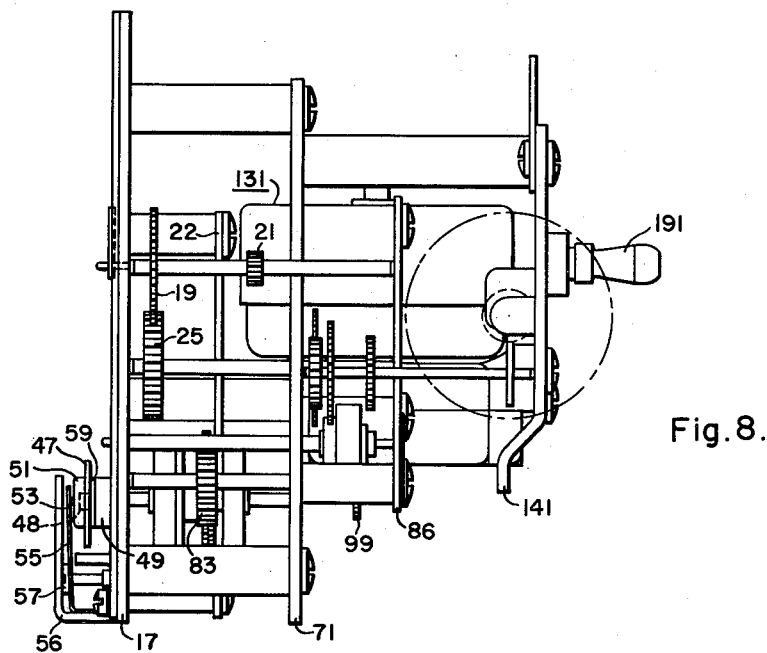
FIG. 8 is a view in side elevation of the measuring device shown in FIG. 1.

In order to show the demand an indicating member such as a maximum-demand pointer 47 is mounted for rotation relative to the dial plate 17 to indicate demand on the scale member 44. The pointer 47 is mounted for rotation about a shaft 48 secured to a collar 49 (FIG. 8) which in turn is secured to the dial plate 17. A disc or spinner 51 has a recess for receiving the end of the shaft 48 which projects through an opening in the pointer. The spinner 51 has an axially projecting tip 53 engaging the free end of a leaf spring 55, the lower end of the leaf spring being secured to a bracket 56 which in turn is secured to the dial plate 17. The pointer 47 is biased against the collar 49 by a pressure which can be adjusted by means of adjustment of a machine screw 57 which changes the pressure exerted by the spring 55 on the spinner 51. A fiber washer 59 may be interposed between the pointer 47 and the collar 49. Sufficient friction is developed to hold the pointer in any position in which it is placed. In its zero position, the pointer 47 engages a stop 61 which is secured to the dial plate 17 and if moved beyond its full scale position the pointer engages a stop 63 which also is secured to the dial plate.

In order to operate the pointer 47, a pusher member 65 is mounted on a shaft 67 for rotation about the axis of rotation of the pointer 47. The pusher member 65 has a portion located beneath the pointer 47. Consequently, clockwise rotation of the pusher member as viewed from the front of the register can actuate the pointer 47 up scale.

Although a single pusher member may be employed for actuating the pointer 47, it is desirable to use a second pusher member 69 which has a portion located below the pointer 47 as viewed in FIG. 1.

Referring to FIG. 2, it will be noted that the shaft 67 to which is secured the pusher member 65 is mounted for rotation in the dial plate 17 and in a plate 71 which is located to the rear of the dial plate. This shaft 67 also has secured to it a gear 73 and a pinion 75.

The pusher member 69 is secured to a sleeve 77 which is mounted for independent rotation on the shaft 67. The sleeve may be held against axial movement in any conventional manner as by means of a split spring ring 79 which is snapped into a peripheral groove located in the shaft 67. The sleeve 77 also has secured to it a gear 81 and a pinion 82.

The gears 73 and 81 are alternately and preferably sequentially coupled to a gear 83 which is secured to a shaft 85 mounted for rotation in the plates 17 and 86. The term sequential is employed to indicate the absence of any overlap in the couplings of the gears 73 and 81 to the gear 83.

In order to effect the desired couplings the gear 73 meshes with a gear 87 mounted on a shaft 89, the shaft being mounted for rotation by the plates 17 and 71. The gear 87 is rotatable relative to the shaft 89. Preferably the shaft 89 is mounted for axial adjustment relative to the plates. To this end, screw threads 89A are formed on one end of the shaft for threaded engagement in a threaded bushing 89B which is secured to the plate 71. The remaining end of the shaft has a screwdriver slot 89C by which the shaft may be rotated for axial adjustment. A set screw may be provided in the bushing for releasably securing the shaft.

The gear 81 meshes with a gear 91 which is mounted for independent rotation on the shaft 89. The shaft has a portion 93 of increased diameter which serves as a spacer between the gears 87 and 91. A split spring washer 94 is located on each end of the shaft 89 to prevent excessive movement of the gears 87 and 91 away from the spacer 93.

The gears 87 and 91 are alternately coupled to the gear 83 through two clutches. In order to minimize friction, the clutches preferably are maintained in their coupling and decoupling conditions by a mechanism which is free to rotate therewith. In a preferred embodiment of the invention, a magnetic spool 95 is mounted for independent rotation on the spacer portion 93. As shown in FIG. 2, the spool 95 has one flange 95A in engagement with the gear 87 and a second flange 95B spaced from the gear 91. Each of these gears has a permanent magnet respectively 87A and 91A which is magnetized to attract the magnetic spool thereto. When the spool is moved downwardly as viewed in FIG. 2, the attraction of the magnet 87A for the spool weakens and the attraction of the magnet 91A for the spool increases until the spool snaps into engagement with the gear 91. The spool has secured thereto a gear 97 which is continuously in mesh with the gear 83. The gear 83 has an axial length sufficient to permit the desired movement of the spool 95 without loss of mesh between the gears 83 and 97.

By inspection of FIG. 1, it will be noted that the shaft 85 has secured thereto a gear 99 which permanently meshes with a gear 101. This gear 101 is mounted on a shaft 103 for rotation relative to the shaft, and the shaft is mounted for rotation by the plates 17, 86. The shaft 103 has portions 103A and 103B of reduced diameter projecting through the plates 17 and 86. The shaft is biased in a forward direction by means of a leaf spring 105 and has a portion of reduced diameter extending beyond the dial plate 17 when the parts are in the positions illustrated in FIG. 1. The gear 101 has secured thereto a pinion 107 which meshes with a pinion 109 secured to the shaft 33. Consequently, the gear 83 is rotated in accordance with rotation of the shaft 13. The gear 101 and the pinion 107 rotate as a unit relative to the shaft on which they are mounted. They may be held against axial displacement in any suitable way as by split spring washers or C-rings 94 which snap into grooves in the shaft 103.

When the scale plate 44 of FIG. 1 is rotated about a vertical axis to the position illustrated in FIG. 9, the tongue 44A engages the projection 103A of the shaft 103 and forces the shaft rearwardly against the bias of the spring 105. This moves the gear 107 out of engagement with the gear 109 and simultaneously moves the gear 101 into engagement with a gear 111 which also is secured to the shaft 33. The gear 101 has an axial length sufficient to permit such movement without losing its meshing engagement with the gear 99. This gear change requires a much greater number of rotations of the shaft 13 to produce the same angular rotation of the gear 83. For example, twice as many rotations of the shaft 13 may be required as a result of the gear change. It will be understood that the calibration of the scale plate 44 which is exposed when the scale plate has the position shown in FIG. 9 is designed to present the correct demand reading.

In order to shift the spool 95 between its operative positions, a shipper 115 is provided which is mounted for rotation about a vertical axis or shaft 117. The right-hand end of the shipper 115 as viewed in FIG. 1 is in the form of a fork having tines 115A and 115B between which the central body of the spool is located. Each of the tines is provided with double buttons 119 having arcuate surfaces for establishing small area contact with the flange 95B or the gear 97.

Operation of the shipper is effected by means of a cam unit 121 which is mounted with a gear 123 on a shaft 125. The shaft in turn is mounted for rotation by the plates 17 and 71. By inspection of FIGS. 2 and 6, it will be noted that the cam unit 121 provides two cam surfaces 127 and 129 which are displaced from each other 180° angularly about the axis of the shaft 125. The shaft 125 rotates in a counterclockwise direction as viewed from the front of a register.

As the cam unit 121 rotates from the position illustrated in FIG. 2, the cam surface 129 ultimately engages the left-hand end of the shipper 115 and forces the shipper in a clockwise direction about its axis. Consequently, the shipper moves the spool 95 in a downward direction as viewed in FIG. 2. When the attraction of the magnet 91A by the spool exceeds that of the magnet 87A, the spool moves promptly into engagement with the gear 91 with a snap action. This movement is not restrained by the cam unit 121.

Upon continued rotation of the cam unit 121, the cam surface 127 ultimately engages the left-hand end of the shipper 115 as viewed in FIG. 2, to return the shipper to the position illustrated in FIG. 2. A final portion of the movement of the spool 95 is essentially a snap action due to the predominant attraction of the magnet 87A for the spool during such final portion.

Although the cam unit 121 may be rotated at a continuous rate, preferably the cam unit is rotated in steps by means of an intermittent-motion coupling interposed between the gear 123 and a small synchronous motor 131 (FIG. 7). The synchronous motor may have an output pinion 133 which rotates at a suitable rate such as one revolution per minute. The pinion 133 meshes with a crown gear 135 which together with a gear 137 are secured to a shaft 139. The shaft is mounted for rotation in the plate 22 and a plate 141. The gear 137 drives a gear 143 which together with a disk 145 are secured to a shaft 147 which is mounted for rotation in the plates 17 and 71.

Continuous rotation of the shaft 147 is converted into intermittent rotation of a shaft 149 (FIG. 1) by a suitable intermittent-motion coupling mechanism. To this end a gear 151 is secured to the shaft 149 adjacent to the disk 145. The disk 145 carries two axially directed pins 145A and 145B each of which is designed to mesh with the gear 151 and drive the gear 151 an angular distance equal to the angular spacing of two successive teeth of the gear 151 during each rotation of the shaft 147. The pins 145A and 145B are spaced angularly 180° from each other about the axis of the disk 145.

If the shaft 149 has sufficient friction it will remain in any position to which it is actuated by one of the pins 145A or 145B while both pins are displaced from the gear 151. However, in order to assure proper retention of the shaft 149 under these circumstances, a second gear 153 is provided which is similar to the gear 151 except that it may have greater thickness. The gears 151 and 153 are displaced angularly from each other about the axis of a shaft 149 by a distance equal to half the angular spacing of successive teeth on one of the gears to position one of the teeth of the gear 153 midway between a pair of adjacent teeth of the gear 151. The diameters of the gear 153 and of the disk 145 and the pitch of the teeth of the gear 153 are selected to place two teeth of the gear 153 adjacent and in sliding engagement with the edge of the disk 145. Each of the pins 145A and 145B has adjacent the pin, a notch 145C or 145D in the edge of the disk 145. As one of the pins such as the pin 145A engages the tooth of the gear 151, the associated notch 145C provides clearance for the immediately trailing tooth of the gear 153 to permit rotation of the gears by the pins. The side of the notch 145C drives the cooperating tooth on the gear 153 and completes the action of the intermittent-motion. Thus, for each rotation of the shaft 147 two impulses or steps are applied to the shaft 149. Such an intermittent-motion is well understood in the art.

The intermittent-motion coupling mechanism herein described is particularly suitable for a maximum-demand register because of the ease with which the interval may be changed. For example, let it be assumed that the structure illustrated in FIG. 1 is designed to provide an interval of 15 minutes. If the disk 145 is replaced by a disk having only one pin and its associated notch, the interval of the register will be changed to 30 minutes.

Although a single intermittent-motion mechanism may be employed in the register, applicant has found it desirable to provide two intermittent-motion mechanisms in tandem. To this end, the shaft 149 is provided with a disk 155 which is similar to the disk 145 previously described. This disk cooperates with gears 157 and 159 which correspond respectively to the gears 151 and 153 and which are secured to a shaft 161. Consequently, each complete rotation of the shaft 149 results in the application of two impulses or steps to the shaft 161. If each of the disks 145 and 155 is replaced by a disk having only one pin with an associated notch, the interval of the register is changed to 60 minutes for the assumed conditions.

The shaft 161 has secured to it a gear 163 which meshes with the gear 123 for the purpose of rotating the cam unit 121. The intermittent stepping of the shaft 125 is designed to carry the camming surface 127 rapidly through its camming position with respect to the shipper 115 during one stepping movement of the shaft 125. This assures a rapid movement of the spool 95 from coupling engagement with the gear 87 into coupling engagement with the gear 91 particularly in cooperation with the permanent magnets 87A and 91A. In a similar manner, the camming surface 129 is moved rapidly through its camming position with respect to the shipper 115.

It will be recalled that each of the pusher members 65 and 69 is coupled and moved from a zero position in accordance with rotation of the associated watt-hour meter shaft 13 for the duration of a separate demand interval. During each of the demand intervals, the de-coupled pusher member is returned or reset to its zero position. The zero position conveniently may be determined by two zero adjuster screws 165 and 167 (FIG. 9) which are in threaded engagement with a bracket 169 secured to the face plate 17. These screws are vertically directed and during a resetting operation, the pusher members 65 and 69 are returned respectively into engagement with the upper ends of the screws 165 and 167. Thus, the zero position of each of the pusher members may be adjusted by manipulation of the appropriate screw. Set screws 166 and 168 are shown for holding the adjusting screws in adjusted position.

The resetting of the pusher members is effected through two sector gears 171 and 173 which are in permanent mesh respectively with the pinions 75 and 82. The sector gears 171 and 173 are located respectively at the ends of arms 171A and 173A, which, in turn, are mounted for independent rotation about a shaft 175. During resetting operations of the pusher members, resetting forces are applied to the arms 171A and 173A respectively, by camming surfaces 171B and 173B. These surfaces are displaced from each other angularly about the axis of the shaft 125 by an angle of 180° and rotate with the shaft 125.

Although separate cam units may be employed for the different camming operations, preferably all of the camming surfaces are located on the common cam unit 121 which serves as a control unit for supervising the operation of the pusher members 65 and 69. By locating all of the camming surfaces on a common cam unit 121, accurate synchronization of the various operations is assured. The cam unit may be formed from a suitable metal, but excellent results have been obtained from a plastic cam unit 121 constructed of a material such as "nylon" or "Teflon." "Nylon" and "Teflon" are the trade names respectively for a super-polyamide material and a polytetrafluoroethylene material. These materials are readily molded to the desired shape on the shaft 125 and have low friction properties.

Although the cam surfaces 171B and 173B may engage directly the arms 171A and 173A, preferably resilient couplings are interposed between the cam surfaces and their respective arms. The construction of such a resilient coupling will be apparent from FIG. 3 wherein a resilient spring ribbon 171R is bent around a hub 171C secured to the arm 171A and has one end 171D projecting upwardly through a notch 171E which is formed in a bracket 171F bent at right angles from the arm 171A.

The extreme tip of the end 171D is bent arcuately to form a smooth cam follower 171G which is to be engaged by the cam surface 171B. The remaining end of the ribbon is bent downwardly into a notch 171K which is formed in a bracket bent at right angles from the arm 171A. With this construction, when the pusher arm operated by the sector gear 171 reaches a zero position, the spring ribbon yields to permit the cam unit to continue its rotation without substantial interference from the arm 171A or its associated components. A cam follower 173G is associated similarly with the arm 173A and cooperates with the cam surface 173B.

In order to show the time elapsed in each interval, an elapsed time pointer 181 is positioned adjacent the exterior surface of the dial plate 17. This pointer together with a gear 183 are secured to a shaft 185 which is mounted for rotation in the plates 17 and 71. Conveniently, the pointer 181 may be driven by a gear 187 secured to the shaft 149 and meshing with the gear 183. The gearing may be proportioned to rotate the pointer 181 one revolution for each demand interval.

As shown in FIG. 7, the rear of the demand register may carry two pins 189 and 191 which are received respectively in collars 189A and 191A which form part of the frame of a watt-hour meter with which the register is associated. The register may be secured in operative position by means of suitable set screws 189B and 191B.

The operation of the demand register now may be set forth. Let it be assumed that the parts are in the positions illustrated in the drawings and that the synchronous motor 131 and the watt-hour meter operating the shaft 13 are both energized. Inasmuch as the shaft 13 is now coupled to the pusher member 65, the pusher member rotates about its axis in accordance with rotation of the shaft 13. As the pusher member rotates, it pushes the demand pointer 47 up scale.

At the same time, the motor 131 is rotating the cam unit 121 in steps through the intermittent-motion mechanism coupling these two units together. It will be assumed that the intermittent-motion mechanism and the gearing are selected to step the cam unit 121 once in each 7½ minutes of operation and that four such steps are required to effect a complete rotation of the cam unit. The cam unit therefore requires one-half hour for a complete rotation thereof.

By the end of a 15 minute interval, the pusher member 65 has pushed the demand pointer 47 up scale to a value corresponding to the demand measured by the associated watt-hour meter for such 15 minute interval. At this time, the camming surface 129 engages the shipper 115 to move the spool 95 into engagement with the gear 91. This operation results in decoupling of the spool from the gear 87 and connects the pusher arm 69 for operation in accordance with rotation of the watt-hour meter shaft 13.

During the next 15 minute interval, the pusher arm 69 moves in an up scale direction and if the demand during this interval exceeds that represented by the position of the pointer 47, the pusher arm 69 engages the pointer 47 to push the pointer further up scale. During this period the cam surface 171B engages its associated cam follower 171G to operate the sector gear 171 in a clockwise direction as viewed from the front of the meter to reset the pusher arm 65 into engagement with its zero adjusting screw 165. This resetting operation occurs again over a substantial part of the movement of the cam unit 121, and again helps to present a more uniform load to the motor 131.

When the pusher member 65 engages its zero adjusting screw 165 the camming surface 171B places the spring ribbon 171R under slight pressure to hold the pusher member against the screw. While the spring ribbon is under this pressure the cam unit operates the shipper 115 to move the spool 95 over to the gear 87, to couple the pusher member 65 to the gear 87 while the spring ribbon is under pressure. Continued movement of the camming surface 171B then clears the cam follower 171G to release the spring ribbon 171R. All of this is accomplished in one rapid stepping movement of the shaft 125. The pusher arm 65 now is coupled to the shaft 13 and the pusher arm 69 is ready for a resetting operation. The resetting of the pusher arm 69 will be understood from the discussion of the resetting of the pusher arm 65.

This cycle is repeated during the billing period which may be of the order of one month. At the end of the billing period a meter reader may read the kilowatt hours indicated by the register for the billing period and also the maximum-demand indicated by the pointer 47 for such period. The meter reader then may reset the pointer 47 to its zero position or into engagement with the effective one of the pusher members at such time to condition the register for the next billing period. Such a resetting operation of a pointer is well understood in the art.

It will be noted that the pusher arms are alternately and sequentially effective to measure the demand during succeeding demand intervals. The register presents an extremely negligible load to the watt-hour meter shaft 13 and the small friction load presented is extremely uniform. Furthermore, the load presented to the motor 131 is reasonably small and uniform.

Although the invention has been described with reference to certain specific embodiments thereof, numerous modifications falling within the spirit and scope of the invention are possible.

I claim as my invention:

1. In a measuring device, a measuring unit for measuring a variable quantity, an indicating member for indicating a function of said variable quantity, means for coupling the indicating member for operation by the measuring unit alternately and sequentially through first and second paths, each of said paths having a coupling condition during which it can couple the indicating member to the measuring unit and a decoupling condition during which the path is decoupled from the measuring unit and timing means having a first operation for respectively placing the first path in the coupling condition and the second path in the decoupling condition substantially simultaneously, said timing means having a second operation for respectively placing the first path in the decoupling condition and the second path in the coupling condition substantially simultaneously, said timing means being effective for alternately performing said first and second operations; said coupling means including first and second elements respectively for said first and second paths, each of said elements when the associated path is in effective coupling condition being operable by the measuring unit from a first condition to a second condition, each of said elements when the associated path is in decoupling condition being resettable from the second condition to the first condition, and resetting means cooperating with the timing means for resetting to the first condition each of the elements during a substantial part of each period in which the associated path is in the decoupling condition.

2. In a measuring device, a supporting structure, a measuring unit having a stator and a rotor which when the measuring unit is energized in accordance with a variable quantity rotates relative to the stator about an axis in accordance with the variable quantity, an indicating member, means mounting the indicating member for rotation about an axis relative to the supporting structure and for maintaining any position to which such indicating member is rotated, first and second pusher members mounted for independent rotation about an axis relative to the structure, each of said pusher members having a reset position and being effective for moving the indicating member in only a first direction of rotation, first releasable coupling means for releasably coupling the first pusher member to the rotor for rotation in said first direction in accordance with rotation of the rotor at a first rate relative to the rotor, second releasable coupling means for releasably coupling the second pusher member to the rotor for rotation in said first direction in accordance with rotation of the rotor at said first rate, and timing means for operating in a cycle the first releasable coupling means to couple the first pusher member to the rotor and substantially simultaneously releasing the second releasable coupling means, and thereafter in said cycle operating the second releasable coupling means to couple the second pusher member to the rotor and substantially simultaneously releasing the first releasable coupling means.

3. In a measuring device, a supporting structure, a measuring unit having a stator and a rotor which when the measuring unit is energized in accordance with a variable quantity rotates relative to the stator about an axis in accordance with the variable quantity, an indicating member, means mounting the indicating member for rotation about an axis relative to the supporting structure and for maintaining any position to which such indicating member is rotated, first and second pusher members mounted for independent rotation about an axis relative to the structure, each of said pusher members having a reset position and being effective for moving the indicating member in only a first direction of rotation, first releasable coupling means for releasably coupling the first pusher member to the rotor for rotation in said first direction in accordance with rotation of the rotor at a first rate relative to the rotor, second releasable coupling means for releasably coupling the second pusher member to the rotor for rotation in said first direction in accordance with rotation of the rotor at said first rate, and timing means for operating respectively in a cycle the first releasable coupling means to couple the first pusher member to the rotor and substantially simultaneously releasing the second releasable coupling means, and thereafter in said cycle operating the second releasable coupling means to couple the second pusher member to the rotor and substantially simultaneously releasing the first releasable coupling means, said timing means including means for resetting each of said pusher members during a substantial part of each period during which such pusher member is in a released condition.

4. In a measuring device, a supporting structure, a measuring unit having a stator and a rotor which when the measuring unit is energized in accordance with a variable quantity rotates relative to the stator about an axis in accordance with the variable quantity, an indicating member, means mounting the indicating member for rotation about an axis relative to the supporting structure and for maintaining any position to which such indicating member is rotated, first and second pusher members mounted for independent rotation about an axis relative to the structure, each of said pusher members having a reset position and being effective for moving the indicating member in only a first direction of rotation, first releasable coupling means for releasably coupling the first pusher member to the rotor for rotation in said first direction in accordance with rotation of the rotor at a first rate relative to the rotor, second releasable coupling means for releasably coupling the second pusher member to the rotor for rotation in said first direction in accordance with rotation of the rotor at said first rate, and motor-operated timing means for operating respectively in a cycle the first releasable coupling means to couple the first pusher member to the rotor and substantially simultaneously releasing the second releasable coupling means, and thereafter in said cycle operating the second releasable coupling means to couple the second pusher member to the rotor and substantially simultaneously releasing the first releasable coupling means, and means coupled to the motor of said motor-operated timing means for resetting each of said pusher members during a substantial part of each period during which such pusher member is in a released condition.

5. In a measuring device, a supporting structure, a measuring unit having a stator and a rotor which when the measuring unit is energized in accordance with a variable quantity rotates relative to the stator about an axis in accordance with the variable quantity, an indicating member, means mounting the indicating member for rotation about an axis relative to the supporting structure and for maintaining any position to which such indicating member is rotated, first and second pusher members mounted for independent rotation about an axis relative to the structure, each of said pusher members having a reset position and being effective for moving the indicating member in only a first direction of rotation, first releasable coupling means for releasably coupling the first pusher member to the rotor for rotation in said first direction in accordance with rotation of the rotor, second releasable coupling means for releasably coupling the second pusher member to the rotor for rotation in said first direction in accordance with rotation of the rotor, said releasable coupling means each comprising a driving member, and a driven member, and separable magnetic means for holding said driving and driven members in driving engagement, and timing means for operating in a cycle the first releasable coupling means to couple the first pusher member to the rotor and substantially simultaneously releasing the second releasable coupling means, said timing means thereafter in said cycle operating the second releasable coupling means to couple the second pusher member to the rotor and substantially simultaneously releasing the first releasable coupling means.

6. In a measuring device, a supporting structure, a measuring unit having a stator and a rotor which when the measuring unit is energized in accordance with a variable quantity rotates relative to the stator about an axis in accordance with the variable quantity, an indicating member, means mounting the indicating member for rotation about an axis relative to the supporting structure and for maintaining any postition to which such indicating member is rotated, first and second pusher members mounted for independent rotation about an axis relative to the structure, each of said pusher members having a reset position and being effective for moving the indicating member in only a first direction of rotation, first releasable coupling means for releasably coupling the first pusher member to the rotor for rotation in said first direction in accordance with rotation of the rotor, second releasable coupling means for releasably coupling the second pusher member to the rotor for rotation in said first direction in accordance with rotation of the rotor, a common operating member operable into a first condition for actuating the first releasable coupling means into coupling condition and the second releasable coupling means into decoupling condition, said common operating member being operable into a second condition for actuating the first releasable coupling means into decoupling condition and the second releasable coupling means into coupling condition, and timing means for repetitively operating the common operating member between said first and second conditions.

7. In a measuring device, a supporting structure, a measuring unit having a stator and a movable member which when the measuring unit is energized by a variable quantity moves relative to the stator in accordance with the variable quantity, an indicating member, means mounting the indicating member for movement relative to the supporting structure and for maintaining any position to which such indicating member is moved, first and second pusher members mounted for independent movement relative to the structure to push the indicating member in a first direction relative to the supporting structure, each of said first and second pusher members when displaced from a reset position being movable in a second direction to the reset position, a cam unit mounted for movement relative to the supporting structure, timing means for moving the cam unit relative to the structure, and cam follower means responsive to a first movement of the cam unit for coupling the first pusher member for movement in the first direction in accordance with movement of said movable member and for substantially simultaneously decoupling the second pusher member from the movable member, said cam follower means being responsive to a second movement of the cam unit for coupling the second pusher member for movement in the first direction in accordance with movement of said movable member and for substantially simultaneously decoupling the first pusher member from the movable member.

8. In a measuring device, a supporting structure, a measuring unit having a stator and a movable member which when the measuring unit is energized by a variable quantity moves relative to the stator in accordance with the variable quantity, an indicating member, means mounting the indicating member for movement relative to the supporting structure and for maintaining any position to which such indicating member is moved, first and second pusher members mounted for independent movement relative to the structure to push the indicating member in a first direction relative to the supporting structure, each of said first and second pusher members when displaced from a reset position being movable in a second direction to the reset position, a cam unit mounted for movement relative to the supporting structure, timing means for moving the cam unit relative to the structure, cam follower means responsive to a first movement of the cam unit for coupling the first pusher member for movement in the first direction in accordance with movement of said movable member and for substantially simultaneously decoupling the second pusher member from the movable member, said cam follower means being responsive to a second movement of the cam unit for coupling the second pusher member for movement in the first direction in accordance with movement of said movable member and for substantially simultaneously decoupling the first pusher member from the movable member, and resetting cam follower means responsive to movement of the cam unit for resetting each of the pusher members to the reset position of such pusher member while the pusher member is decoupled from the movable member.

9. In a measuring device, a supporting structure, a measuring unit having a stator and a rotatable member which when the measuring unit is energized by a variable quantity rotates relative to the stator in accordance with the variable quantity, an indicating member, means mounting the indicating member for rotation relative to the supporting structure and for maintaining any position to which such indicating member is rotated, first and second pusher members mounted for independent rotation relative to the structure to push the indicating member in a first direction relative to the supporting structure, each of said first and second pusher members when displaced from a reset position being rotatable in a second direction to the reset position, a cam unit mounted for rotation relative to the supporting structure, timing means for rotating the cam unit relative to the structure, and cam follower means responsive to a first rotation of the cam unit for coupling the first pusher member for rotation in the first direction in accordance with rotation of said rotatable member and for substantially simultaneously decoupling the second pusher member from the rotatable member, said cam follower means being responsive to a second rotation of the cam unit for coupling the second pusher member for rotation in the first direction in accordance with rotation of said rotatable member and for substantially simultaneously decoupling the first pusher member from the rotatable member, the positions of the cam unit for said first and second rotation being displaced from each other 180° about the axis of rotation of the cam unit.

10. In a measuring device, a supporting structure, a measuring unit having a stator and a rotatable member which when the measuring unit is energized by a variable quantity rotates relative to the stator in accordance with the variable quantity, an indicating member, means mounting the indicating member for rotation relative to the supporting structure and for maintaining any position to which such indicating member is rotated, first and second pusher members mounted for independent rotation relative to the structure to push the indicating member in a first direction relative to the supporting structure, each of said first and second pusher members when displaced from a reset position being rotatable in a second direction to the reset position, a cam unit mounted for rotation relative to the supporting structure, timing means for rotating the cam unit relative to the structure, said cam unit comprising first and second cam surfaces for moving associated cam followers in a direction transverse to the axis of rotation of the cam unit, said cam surfaces being displaced from each other 180° about the axis of rotation of the cam unit and being displaced from each other in a direction parallel to said axis, said cam unit comprising third and fourth cam surfaces for moving an associated cam follower in first and second directions respectively parallel to the axis of rotation of the cam unit, said third and fourth cam surfaces being displaced from each other 180° about the axis of rotation of the cam unit, first cam follower means controlled by said third and fourth cam surfaces for controlling the coupling of the pusher members to said rotatable member, said first cam follower means when actuated by the third cam surface being effective for coupling the first pusher member for rotation in the first direction in accordance with rotation of the rotatable member and for decoupling the second pusher member from the rotatable member, said first cam follower means when actuated by the fourth cam surface being effective for coupling the second pusher member for rotation in the first direction in accordance with rotation of the rotatable member and for decoupling the first pusher member from the rotatable member, second cam follower means when actuated by the first cam surface being effective for rotating the first pusher member in the second direction to its reset position while such first pusher member is decoupled from the rotatable member, and third cam follower means when actuated by the second cam surface being effective for rotating the second pusher member in the second direction to its reset position while such second pusher member is decoupled from the rotatable member.

11. In a measuring device, a supporting structure, a measuring unit having a stator and a movable member which when the measuring unit is energized by a variable quantity moves relative to the stator in accordance with the variable quantity, an indicating member, means mounting the indicating member for movement relative to the supporting structure and for maintaining any position to which such indicating member is moved, first and second pusher members mounted for independent movement relative to the structure to push the indicating member in a first direction relative to the supporting structure, each of said first and second pusher members when displaced from a reset position being movable in a second direction to the reset position, a cam unit mounted for movement relative to the supporting structure, timing means for moving the cam unit relative to the structure, cam follower means responsive to a first movement of the cam unit for coupling the first pusher member for movement in the first direction in accordance with movement of said movable member and for decoupling the second pusher member from the movable member, said cam follower means being responsive to a second movement of the cam unit for coupling the second pusher member for movement in the first direction in accordance with movement of said movable member and for decoupling the first pusher member from the movable member, and resetting cam follower means responsive to movement of the cam unit for resetting each of the pusher members to the reset position of such pusher member while the pusher member is decoupled from the movable member, said resetting cam follower means during the resetting of one of the pusher members establishing a yieldable coupling between the cam unit and the associated pusher member.

12. In a measuring device, a supporting structure, a measuring unit having a stator and a movable member which when the measuring unit is energized by a variable quantity moves relative to the stator in accordance with the variable quantity, an indicating member, means mounting the indicating member for movement relative to the supporting structure and for maintaining any position to which such indicating member is moved, first and second pusher members mounted for independent movement relative to the structure to push the indicating member in a first direction relative to the supporting structure, each of said first and second pusher members when displaced from a reset position being movable in a second direction to the reset position, a cam unit mounted for movement relative to the supporting structure, timing means for moving the cam unit relative to the structure, cam follower means responsive to a first movement of the cam unit for coupling the first pusher member for movement in the first direction in accordance with movement of said movable member and for substantially simultaneously decoupling the second pusher member from the movable member, said cam follower means being responsive to a second movement of the cam unit for coupling the second pusher member for movement in the first direction in accordance with movement of said movable member and for substantially simultaneously decoupling the first pusher member from the movable member, and resetting cam follower means responsive to movement of the cam unit for resetting each of the pusher members to the reset position of such pusher member while the pusher member is decoupled from the movable member, said cam unit comprising a unitary cam having spaced cam surfaces for operating said coupling and resetting cam follower means.

13. In a measuring device, a supporting structure, a measuring unit having a stator and a movable member which when the measuring unit is energized by a variable quantity moves relative to the stator in accordance with the variable quantity, an indicating member, means mounting the indicating member for movement relative to the supporting structure and for maintaining any position to which such indicating member is moved, first and second pusher members mounted for independent movement relative to the structure to push the indicating member in a first direction relative to the supporting structure, each of said first and second pusher members when displaced from a reset position being movable in a second direction to the reset position, a cam unit mounted for movement relative to the supporting structure, timing means for moving the cam unit relative to the structure, in intermittent steps, cam follower means responsive to a first movement of the cam unit for coupling the first pusher member for movement in the first direction in accordance with movement of said movable member and for decoupling the second pusher member from the movable member, said cam follower means being responsive to a second movement of the cam unit for coupling the second pusher member for movement in the first direction in accordance with movement of said movable member and for decoupling the first pusher member from the movable member, and resetting cam follower means responsive to movement of the cam unit for resettting each of the pusher members to the reset position of such pusher member while the pusher member is decoupled from the movable member, each of said pusher members being decoupled from the movable member and being reset during at least parts of two consecutive steps of the timing means.

14. In a measuring device, a supporting structure, a measuring unit having a stator and a movable member which when the measuring unit is energized by a variable quantity moves relative to the stator in accordance with the variable quantity, an indicating member, means mounting the indicating member for movement relative to the supporting structure and for maintaining any position to which such indicating member is moved, first and second pusher members mounted for independent movement relative to the structure to push the indicating member in a first direction relative to the supporting structure, each of said first and second pusher members when displaced from a reset position being movable in a second direction to the reset position, a cam unit mounted for movement relative to the supporting structure, timing means for moving the cam unit relative to the structure in intermittent steps, cam follower means responsive to a first movement of the cam unit for coupling the first pusher member for movement in the first direction in accordance with movement of said movable member and for decoupling the second pusher member from the movable member, said cam follower means being responsive to a second movement of the cam unit for coupling the second pusher member for movement in the first direction in accordance with movement of said movable member and for decoupling the first pusher member from the movable member, and resetting cam follower means responsive to movement of the cam unit for resetting each of the pusher members to the reset position of such pusher member while the pusher member is decoupled from the movable member, each of said pusher members being decoupled from the movable member and being reset during at least parts of two consecutive steps of the timing means, and the first named cam follower means being effective to complete a coupling of one of the pusher members and a decoupling of the other of the pusher members in less than one step of the timing means.

15. In a measuring device, a supporting structure, a measuring unit having a stator and a rotatable member which when the measuring unit is energized by a variable quantity rotates relative to the stator in accordance with the variable quantity, an indicating member, means mounting the indicating member for rotation relative to the supporting structure and for maintaining any position to which such indicating member is rotated, first and second pusher members mounted for independent rotation relative to the structure to push the indicating member in a first direction relative to the supporting structure, each of said first and second pusher members when displaced from a reset position being rotatable in a second direction to the reset position, a cam unit mounted for rotation relative to the supporting structure, timing means for rotating the cam unit relative to the structure in intermittent steps, cam follower means responsive to a first rotation of the cam unit for coupling the first pusher member for rotation in the first direction in accordance with rotation of said rotatable member and for decoupling the second pusher member from the movable member, said cam follower means being responsive to a second rotation of the cam unit for coupling the second pusher member for rotation in the first direction in accordance with rotation of said rotatable member and for decoupling the first pusher member from the rotatable member, the positions of the cam unit for said first and second rotation being displaced from each other 180° about the axis of rotation of the cam unit, and resetting cam follower means responsive to rotation of the cam unit for resetting each of the pusher members to the reset position of said pusher member while the pusher member is decoupled from the movable member, the first-named cam follower means being effective for completing said coupling of one of said pusher arms and a decoupling of the other of the pusher members in less than one step of said timing means, said cam unit being rotated a plurality of steps by the timing means between each pair of successive operations of the first-named cam follower means.

16. In a measuring device, a supporting structure, a measuring unit having a stator and a rotatable member which when the measuring unit is energized by a variable quantity rotates relative to the stator in accordance with the variable quantity, an indicating member, means mounting the indicating member for rotation relative to the supporting structure and for maintaining any position to which such indicating member is rotated, first and second pusher members mounted for independent rotation relative to the structure to push the indicating member in a first direction relative to the supporting structure, each of said first and second pusher members when displaced from a reset position being rotatable in a second direction to the reset position, a cam unit mounted for rotation relative to the supporting structure, timing means for rotating the cam unit relative to the structure in intermittent steps, cam follower means responsive to a first rotation of the cam unit for coupling the first pusher member for rotation in the first direction in accordance with rotation of said rotatable member and for decoupling the second pusher member from the movable member, said cam follower means being responsive to a second rotation of the cam unit for coupling the second pusher member for rotation in the first direction in accordance with rotation of said rotatable member and for decoupling the first pusher member from the rotatable member, the positions of the cam unit for said first and second rotation being displaced from each other 180° about the axis of rotation of the cam unit, and resetting cam follower means responsive to rotation of the cam unit for resetting each of the pusher members to the reset position of said pusher member while the pusher member is decoupled from the movable member, the first-named cam follower means being effective for completing said coupling of one of said pusher arms and a decoupling of the other of the pusher members in less than one step of said timing means, said cam unit being rotated a plurality of steps by the timing means between each pair of successive operations of the first-named cam follower means, and each of said pusher arms being decoupled from the rotatable member and being reset during a plurality of intermittent steps of the cam unit.

17. In a measuring device, a measuring unit for measuring a variable quantity, indicating means for indicating a function of a variable quantity, and control means operable for controlling the coupling of the indicating means for operation by the measuring unit, said control means comprising first, second and third members mounted for independent rotation about a common axis, said first and third members being axially spaced along the common axis, said second member being selectively movable along the common axis from physical engagement with the first member to establish a first coupling between the indicating means and the measuring unit towards the third member to interrupt said first coupling, said first and third members each including a magnetic material, said second member including a magnetic material, at least one of said magnetic materials being permanently magnetic and said magnetic materials being located to develop a magnetic holding force between and acting to hold in engagement the second member and the nearer of the first and third members.

18. In a measuring device, a measuring unit for measuring a variable quantity, indicating means for indicating a function of a variable quantity, and control means operable for controlling the coupling of the indicating means for operation by the measuring unit, said control means comprising first, second and third members mounted for independent rotation about a common axis, said first and third members being axially spaced along the common axis, said second member being selectively movable along the common axis from physical engagement with the first member to establish a first coupling between the indicating means and the measuring unit into physical engagement with the third member to establish a second coupling between the indicating means and the measuring unit, said first and third members each including a magnetic material, said second member including a magnetic material, at least one of said magnetic materials being permanently magnetic and said magnetic materials being located to develop a magnetic holding force between the engaged ones of said members to hold such engaged ones in engagement.

19. In a measuring device, a measuring unit for measuring a variable quantity, indicating means for indicating a function of a variable quantity, and control means operable for controlling the coupling of the indicating means for operation by the measuring unit, said control means comprising first, second and third members mounted for independent rotation about a common axis, said first and third members being axially spaced along the common axis, said second member being selectively movable along the common axis from physical engagement with the first member to establish a first coupling between the indicating means and the measuring unit into physical engagement with the third member to establish a second coupling between the indicating means and the measuring unit, said first and third members each including a magnetic material, said second member including a magnetic material, at least one of said magnetic materials being permanently magnetic to develop a first magnetic force acting in a direction parallel to said axis to urge said first and second members into physical engagement and to develop a second magnetic force acting in a direction parallel to said axis to urge said second and third members into physical engagement.

References Cited in the file of this patent

UNITED STATES PATENTS

| | | |
|---|---|---|
| 824,805 | Müller | July 3, 1906 |
| 2,000,736 | Ballantine | May 7, 1935 |
| 2,132,256 | Cameron | Oct. 4, 1938 |
| 2,382,009 | Heynisch | Aug. 14, 1945 |
| 2,384,350 | Skulley | Sept. 4, 1945 |
| 2,424,689 | Hamill | July 29, 1947 |
| 2,437,871 | Wood | Mar. 16, 1948 |
| 2,449,283 | Dike | Sept. 14, 1948 |
| 2,885,639 | Tewksbury | May 5, 1959 |